INVENTOR.

Reuben C. Carlson

BY

J. D. Douglas

His atty

INVENTOR.

BY Reuben C. Carlson

J. D. Douglas

His atty

INVENTOR.
Reuben C. Carlson

BY
J. D. Douglas
His atty

INVENTOR.
Reuben C. Carlson
BY
J. W. Douglas
His Atty

INVENTOR.

BY Reuben C. Carlson

J. D. Douglass

His atty

INVENTOR.
Reuben C. Carlson
BY
J. ?. Douglas
His Atty.

April 15, 1969 R. C. CARLSON 3,438,636

REPEATING PHONOGRAPH RECORD CHANGER

Filed Sept. 23, 1966 Sheet 7 of 9

INVENTOR.
Reuben C. Carlson

BY J. W. Douglass
His atty

REPEATING PHONOGRAPH RECORD CHANGER

INVENTOR.
Reuben C. Carlson
BY
J. W. Douglas
His Atty

INVENTOR.
Reuben C. Carlson
BY J. D. Douglas
his atty

United States Patent Office 3,438,636
Patented Apr. 15, 1969

3,438,636

REPEATING PHONOGRAPH RECORD CHANGER

Reuben C. Carlson, Bensonville, Ill., assignor to Marvco Tool & Mfg., Franklin Park, Ill., a corporation of Illinois Filed Sept. 23, 1966, Ser. No. 581,515
Int. Cl. G11b *17/10*
U.S. Cl. 274—10 9 Claims

ABSTRACT OF THE DISCLOSURE

A plurality of records are disposed on a spindle and released one at a time to a turntable where they are played. When the last record of the stack is discharged a sensing member is operated and after the last record is played the entire stack of records is raised up and replaced on the spindle.

This invention relates generally to repeating phonographs and more particularly to a repeating phonograph which will raise the records that have been played, from the turntable, and replay them again.

The present invention contemplates the provision of a record player which supports the records on a central spindle from which they are released one at a time and played in sequence. When the final record has been played they are raised from the turntable and replaced on the spindle and the stack is automatically replayed. The record player includes an actuating mechanism for replaying the records which temporarily interrupts the record changing and playing cycle after the final record has been played, replaces the stack of records and then starts the record changing and plying cycle anew. These and other features, together with a fuller understanding of the invention will become more apparent from the following description and drawings in which:

Figures 21, 22:
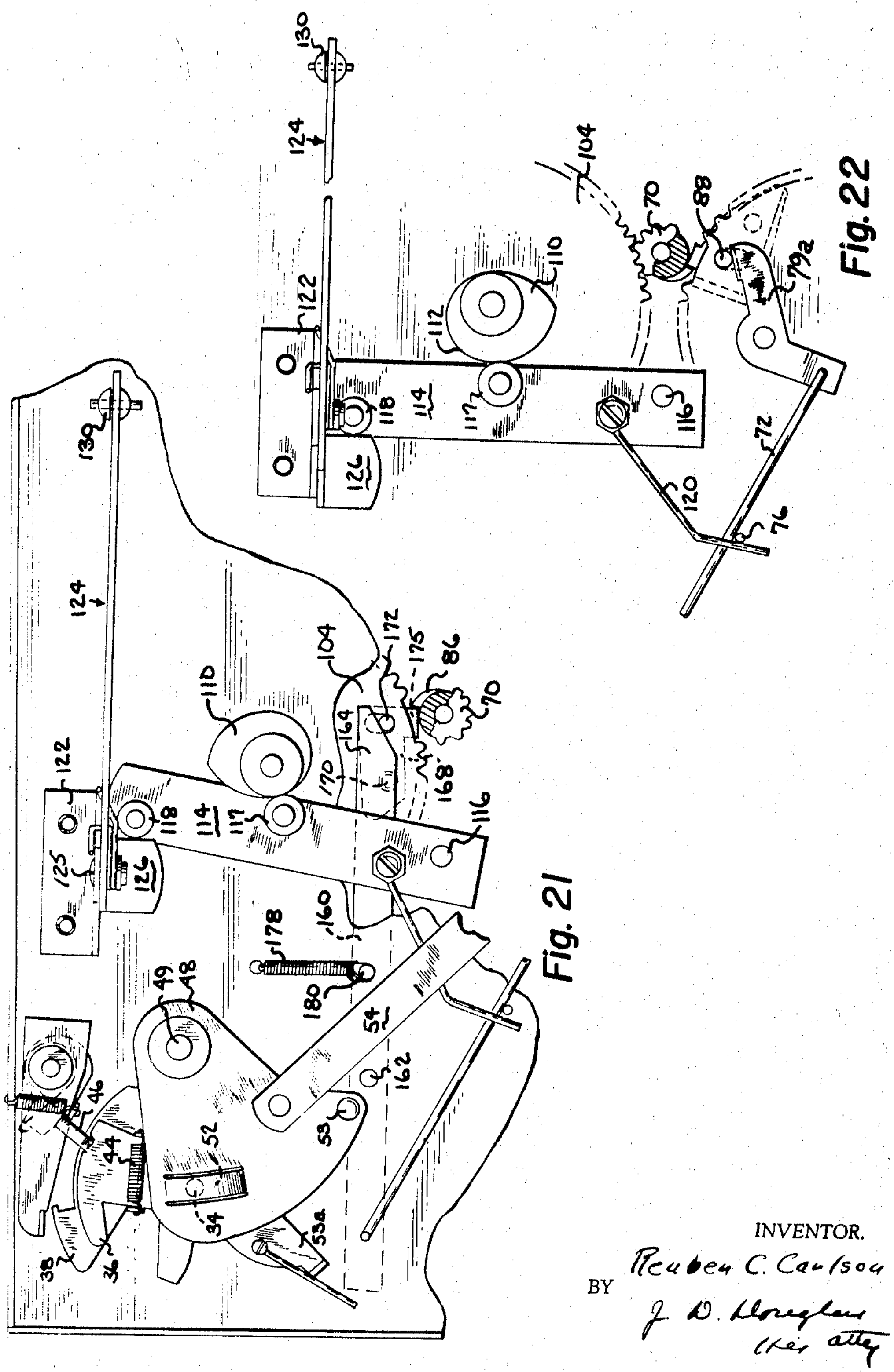

FIGURE 21 is a bottom plan view of parts of the phonograph with the tone arm in the retracted position after the last record has been played, wherein the tone arm has been lowered to actuate the mechanism for raising the records from the turntable; and FIGURE 22 is a bottom plan view of parts of the phonograph showing the phonograph part way through the cycle of raising the records from the turntable.

Figures 15, 16, 17:
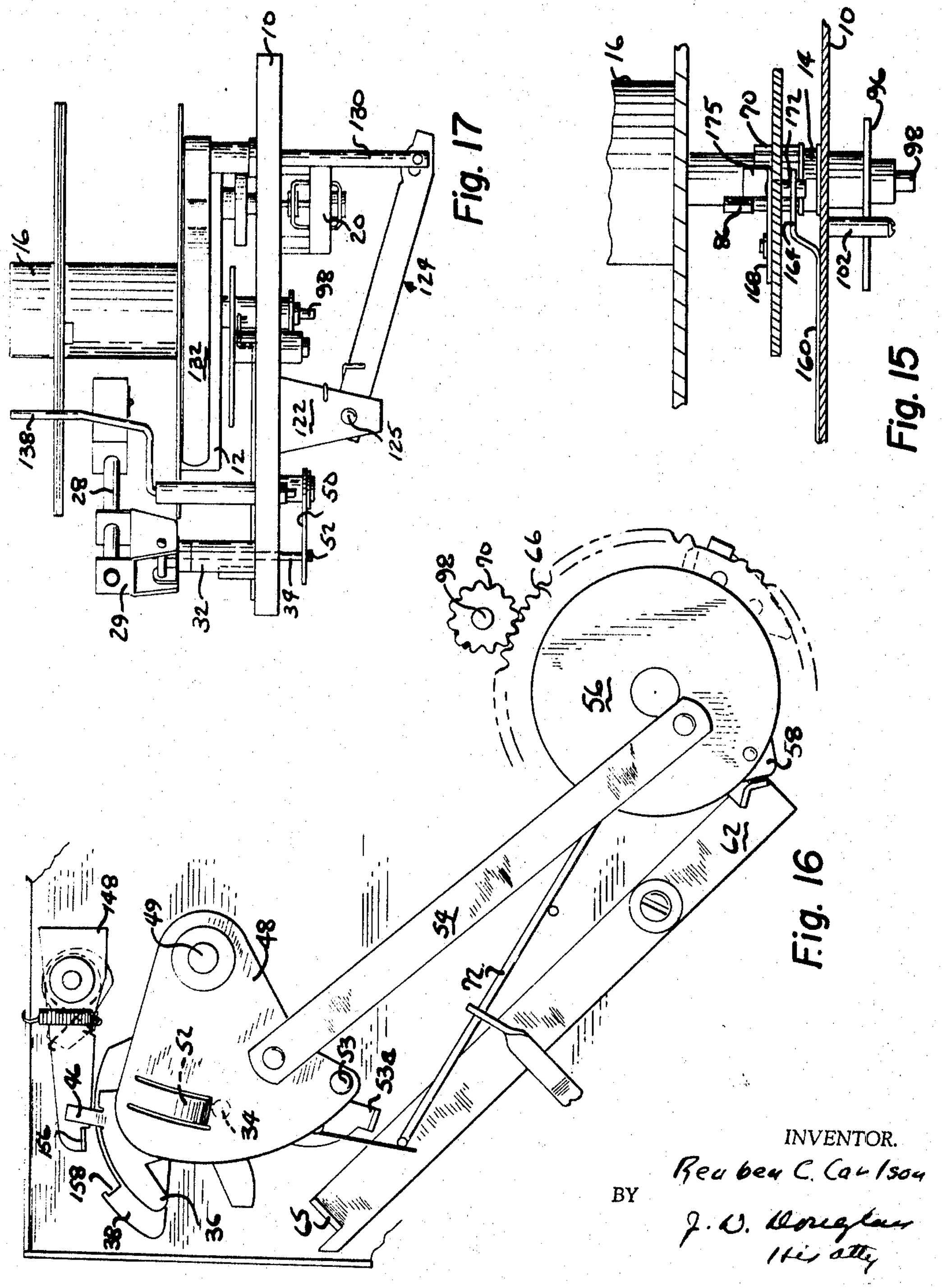
FIGURE 15 is a detail view, partially in section, of the actuating mechanism for the record raising cycle.
FIGURE 16 is a bottom plan view of parts of the phonograph during the record changing cycle wherein the tone arm has been raised prior to retraction.
FIGURE 17 is a side elevational view of the phonograph in the position shown in FIGURE 16.

Referring now to the drawings and for the present to FIGURES 1, 7, 8, 9 and 12 a phonograph embodying this invention is shown in the record playing position. The phonograph has sheet metal support plate 10 on which a turntable 12 is journalled for rotation by bearing 14 (FIGURES 13 and 15). A stationary non-rotatable center spindle 16 is provided which is secured to the support plate 10 by a rod 18, FIGURE 1, which passes through the center of the turntable 12. The turntable is rotatably driven from an electric motor 20, FIGURE 7, through a friction drive wheel 22, FIGURE 8, which frictionally engages the inner surface of the turntable rim. The center spindle is provided with conventional record releasing mechanism which includes a pair of record support members 24, FIGURES 1 and 9, which are spring biased to normally project from the spindle 16 in a record supporting position and are retractable by a mechanism within the spindle (not shown) to release the bottom record from the stack. When the record support members 24 are retracted, the mechanism in the spindle extends a pair of flat leaves 26 between the bottom record being reelased and the record immediately above it to allow only the bottom record to be released in a conventional manner. After the bottom record has been reelased, the support members 24 are again extended and the flat leaves 26 are retracted. This type of record releasing mechanism is conventional and does not per se constitute any part of this invention.

The phonograph is provided with a tone arm 28 of any conventional design having an appropriate needle (not shown) in a pickup which is connected to an amplifying system, also not shown. The tone arm mounting and operating mechanism includes the tone arm 28 pivotally mounted by a bracket 29 to a hollow sleeve 30, FIGURE 1, and may be rocked about the pivot to raise and lower the pickup. The sleeve 30 in turn is rotatably mounted on a hollow post 32 secured to the support plate 10. A tone arm raising pin 34 extends through the sleeve 30 and is disposed to engage the underside of the tone arm 28, to raise and lower it as will be described presently. The sleeve 30 has a tone arm swing plate 36 secured to its lower end beneath the support plate 10 (FIG. 7) which moves rotatably with the sleeve 30 as it is rotated in the post 32. A tone arm control plate 38 juxtaposed to and above the plate 36 is rotatably journalled on the sleeve 30 in sliding engagement with the plate 36. The plates 36 and 38 each have downwardly extending ears 40 and 42, respectively, on opposite edges and a spring 44 extends between the ears and urges the ear 42 into contact with the plate 36 resiliently holding the plates in fixed position but permitting them to be moved relative to each other. The swing plate 36 has a leg 46 depending therefrom which is offset below and extends outwardly.

The raising pin 34 rides on top of a generally triangular cam plate 48 which is pivotally mounted on a post 49 secured to and extending downwardly from the base 10. The cam plate has a flat surface 50 and a downwardly extending V shaped camming surface 52. It is also provided with an upwardly projecting pin 53 at one corner which is disposed to engage the edge surface 53*a* of the swing plate 36. A link 54 connects the cam 48 eccentrically to a disc 56 journalled for rotation beneath and from the support plate 10. The disc has a radially extending projection 58 which is disposed to engage a cam lug 60 depending from a lever 62 pivotally mounted to the bottom of the support base 10 by a pin 64. The opposite end of the lever 62 is also provided with a downwardly extending projection 65 disposed to engage one edge 65*a* of the swing plate 36.

Figure 8:
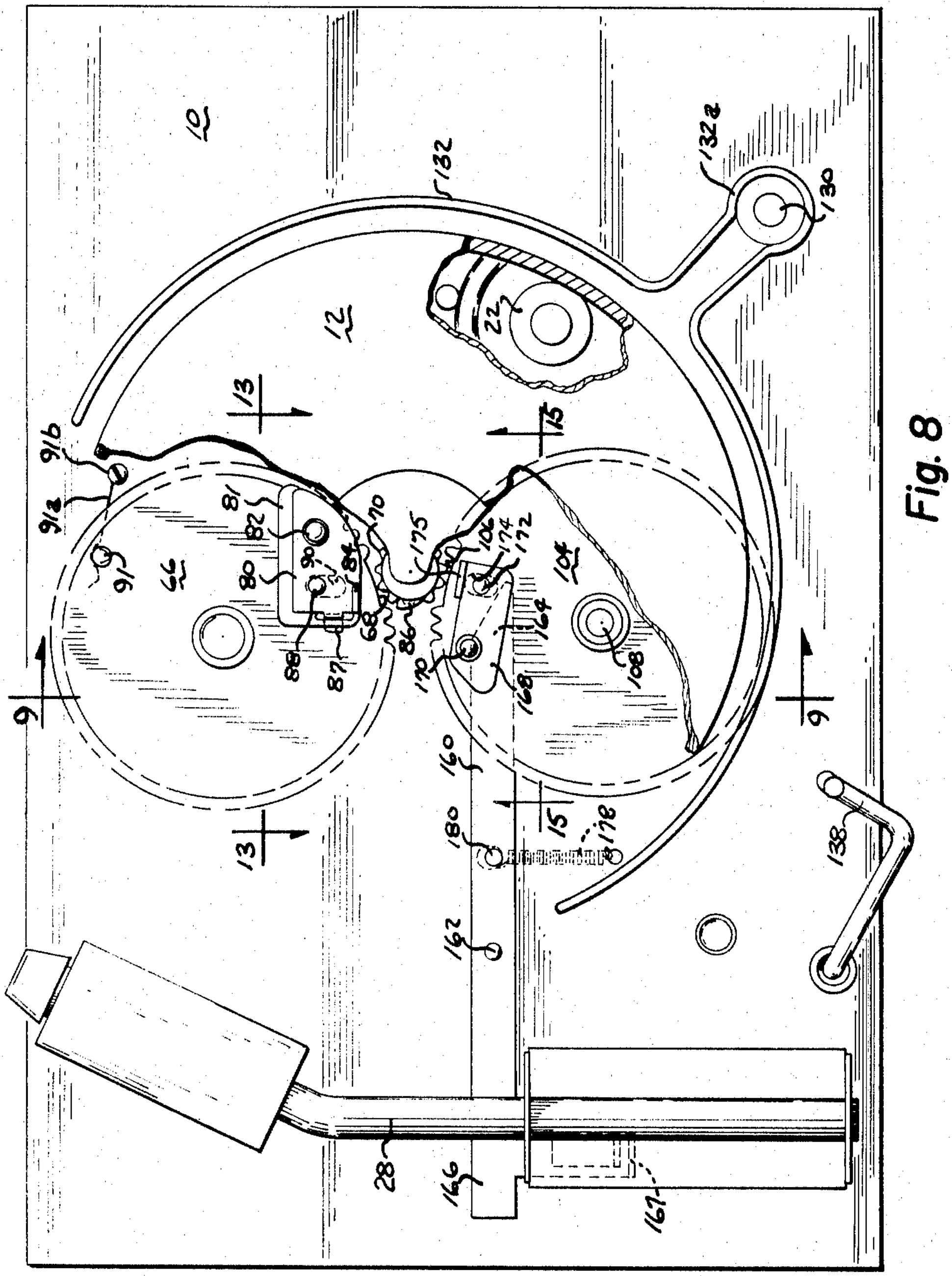
FIGURE 8 is a top plan view of the phonograph with parts broken away to show underlying parts.

The disc 56 is driven by a mutilated gear 66, FIGURE 8, which is secured to the disc 56 and disposed above the support plate 10. The mutilated gear 66 is provided with a short section 68 devoid of gear teeth, which short section is normally adjacent a central gear 70 mounted on the turntable hub 12 and rotatable therewith. The mutilated gear 66 has a pair of juxtaposed flat leaf members 80 and 81 pivotally mounted on the top thereof by a pin 82. The upper leaf member 80 has an upwardly extending lug 84 disposed to be moved in and out of engagement with a lug 86 disposed above the central gear 70 and rotatable therewith. It also has a downwardly extending offset lug 87 which extends through a slot in the lower leaf member and a slot in the gear and laterally below the gear to limit the movement of the leaf and prevent it from rising. The lower leaf member 81 has a pin 88 extending through slot 90 in the gear 66 which limits the movement of the leaf. The mutilated gear 66 also has a pin 91 depending therefrom which is engaged by resilient detent wire 91*a* secured to the support frame 10 by screw 91*b*. This holds the gear in the "off" cycle position while a record is being played.

Figures 5, 6:
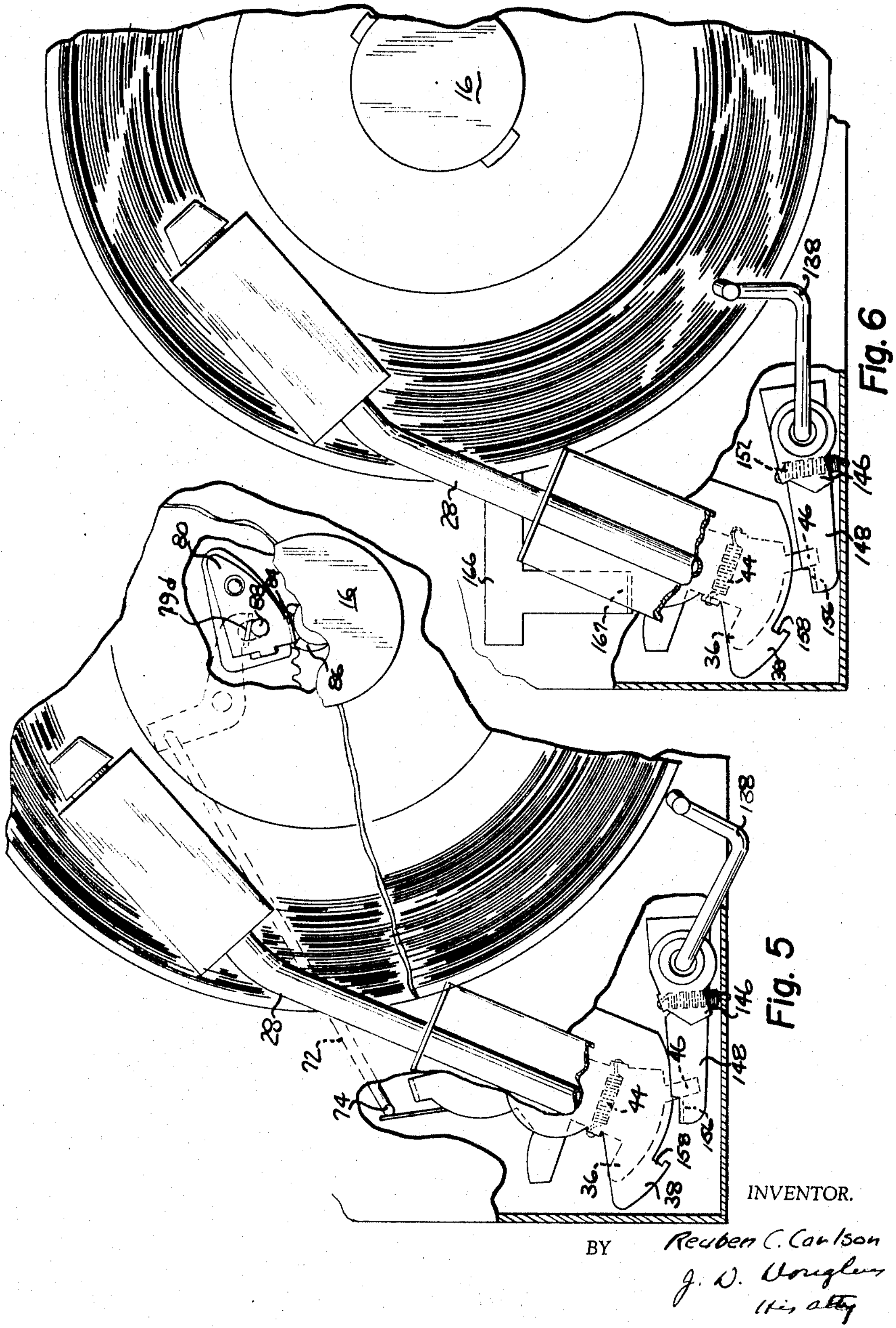
FIGURE 5 is a top plan view with parts of the phonograph broken away and removed for clarity, with the parts in the record playing position.
FIGURE 6 is a similar view with the parts in the position for initiating a record raising cycle.
Figure 7:
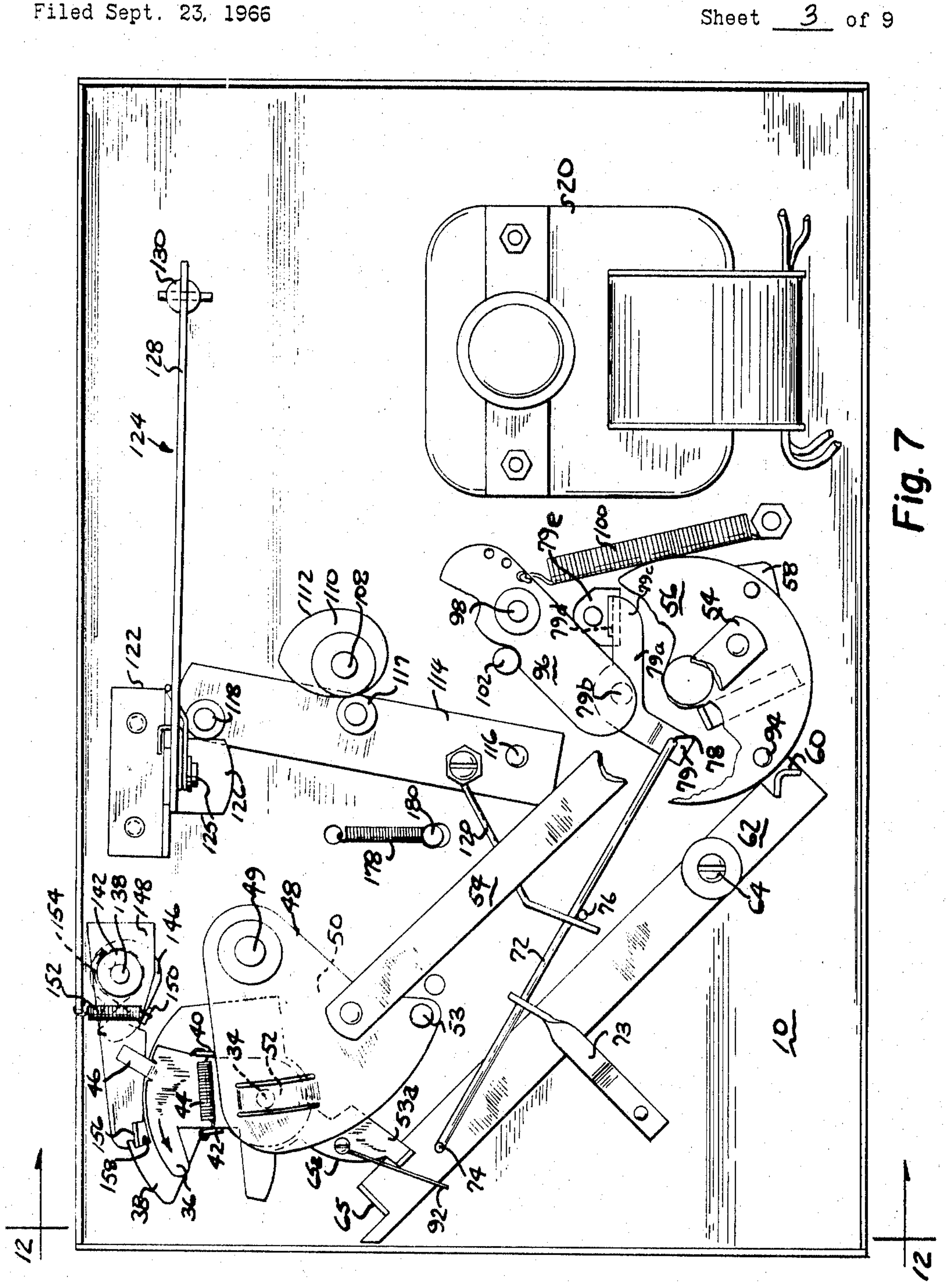
FIGURE 7 is a bottom plan view of the record changer, with the parts in a record playing position.

A trip slide 72, FIGURES 5 and 7, which is depicted as a rod but could be of other formation, is slidably mounted on the underside of the support plate 10 in a bracket 73. It has a downwardly extending actuating leg 74 at one end and a downwardly extending central leg 76 and an upwardly turned end portion 78 at the other end engaged in one end 79 of a trip lever 79*a* pivotally mounted beneath the support base 10 on pivot pin 79*b*. The other end 79*c* of the lever 79*a* has an upwardly projecting arm 79*d* which projects through an opening 79*e* in the support base 10 to a position below the mutilated gear 66 and adjacent the pin 88, FIGURE 5.

Figures 11, 12, 13, 14:
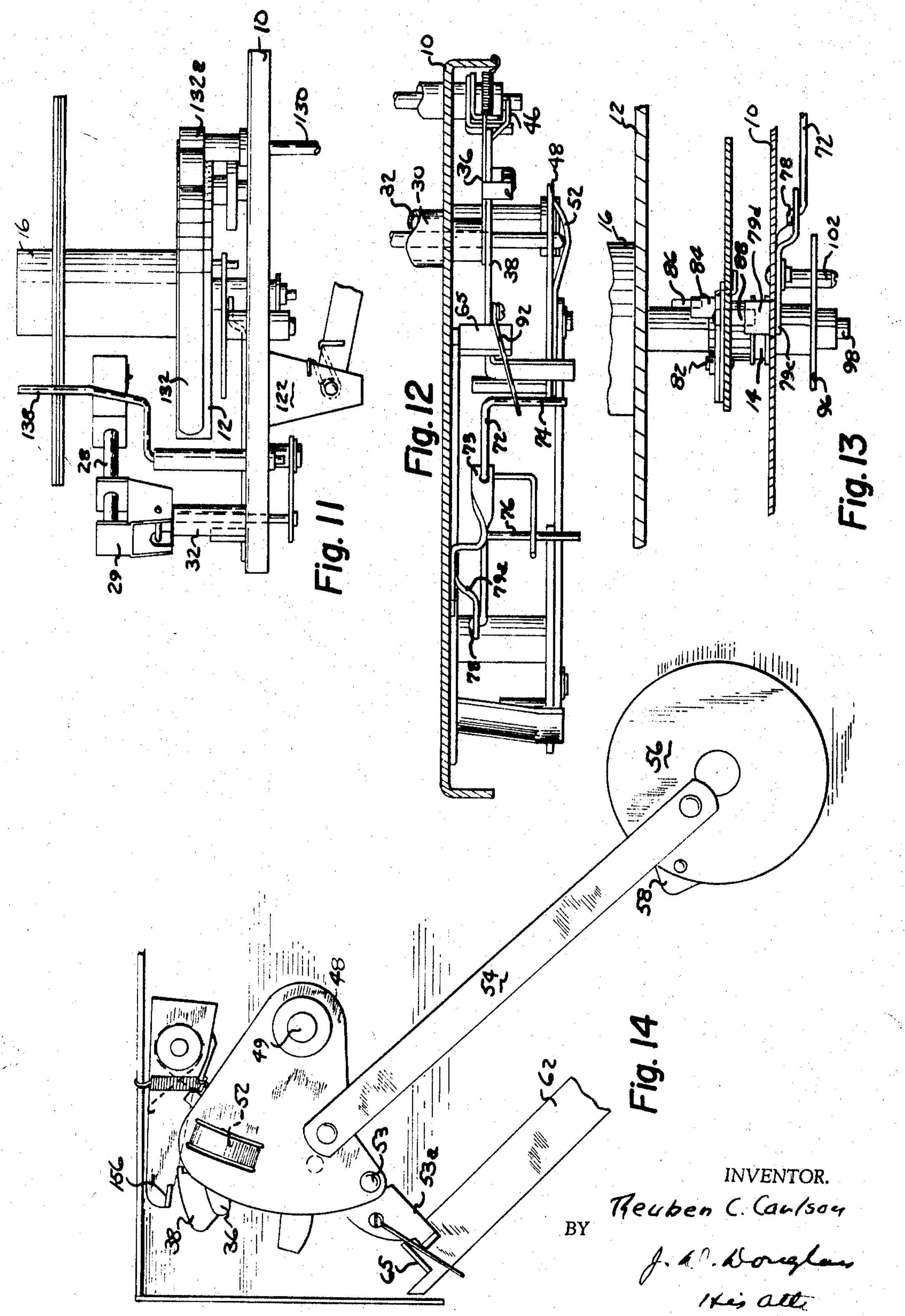
FIGURE 11 is a side elevational view of the phonograph when the record changing cycle is starting near the completion of the record raising cycle.
FIGURE 12 is a sectional view taken substantially along the plane designated by the line 12—12 of FIGURE 7.
FIGURE 13 is a detail view, partially in section, of the actuating mechanism for the record changing cycle.
FIGURE 14 is a bottom plan view of parts of the phonograph when the tone arm is in a retracted position after playing the final record of a stack.

As can be seen in FIGURES 7 and 12 a resilient trip actuating wire 92 is secured to the plate 36 and is movable therewith. It is positioned to engage the end leg 74 of the rod 72 as the plate 38 turns with the movement of the tone arm 28.

The disc 56 is provided with a pin 94 projecting upwardly therefrom and disposed to engage the edge of a lever arm 96 mounted on a rod 98 which, when rotated, operates the record releasing means in the spindle 16 to cause the release of a record. The arm 96 is normally urged into engagement with a stop post 102 by a spring 100 connected between the arm and the base. The mechanism in the spindle for operating the release mechanism upon rotation of the rod 98 is conventional and is not shown herein and does not per se form any part of this invention.

Referring again to FIGURE 8, a second mutilated gear 104 is journalled on top of the support plate 10 on the opposite side of the central gear 70 from that of the mutilated gear 66. The gear 104 has a short section 106, devoid of teeth, normally positioned adjacent the central gear 70. As can best be seen in FIGURE 7, the mutilated gear has a shaft 108 which extends through the support plate 10 and has secured thereto a cam 110 having a generally elliptical peripheral surface 112. The surface 112 engages with a roller 117 depending from a lever 114 mounted on the lower side of support plate 10 on a post 116. One end of the lever 114 is provided with a second roller 118 depending therefrom.

Figure 1:
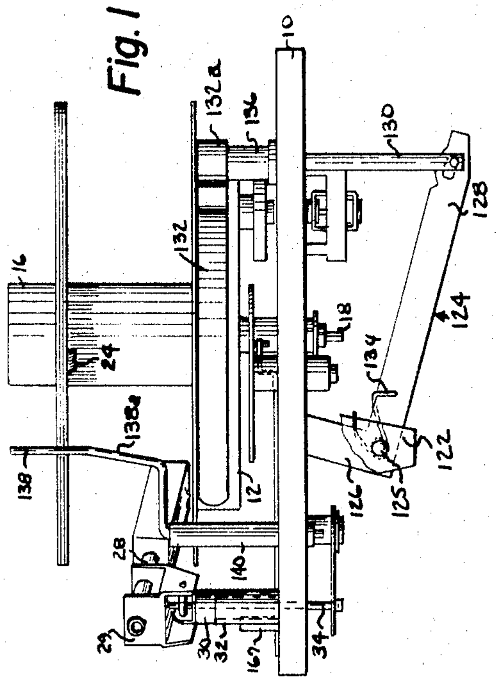
FIGURE 1 is a side elevational view of the phonograph in a record playing position.

Referring also to FIGURE 1, a bracket 122 extending downwardly from the bottom of the support plate 10, pivotally mounts a bell crank lever 124 on a pivot pin 125. One arm 126 of the lever 124 contacts the roller 118 of the lever 114 and the other arm 128 of the lever 124 has pivotally secured thereto a record lift rod 130 which extends vertically through the support base 10.

A record lifting member 132, FIGURE 8, is secured to the end of the rod 130 and has oppositely extending arcuate arms which partially surround the turntable 12 in spaced relation thereto. The top of the record lifting member is normally disposed below the top surface of the turntable, out of contact with any records supported thereby in playing position. A spring 134 is interposed between the L-shaped member 124 and the bracket 122 normally urging the arm 128 of the member to its lower position. The rod 130 extends through a bearing sleeve 136 extending upward from the support base 10. The sleeve abuts the hub 132*a* of the record lifting member 132 to define its lowered position.

A record edge sensor in the form of a bent crank rod 138, FIGURE 1, is rotatably journalled in a hollow post 140 secured to the top of the support base 10. As can be seen in FIGURE 7, the lower end of the rod 138 has an upper plate 146 secured thereto by a collar 142 and movable therewith. A second lower plate 148 is journalled on the collar 142 in independent sliding rotation engagement with the plate 146. The upper plate 146 is provided with a depending leg 150. A spring 152 between the leg 150 and support frame 10 urges the plate 146 toward the side of the frame and the leg 150 into engagement with the lower plate 148. An additional coil spring 154 is provided which surrounds the collar 142 with the ends hooked over the edges of the plates 146 and 148 and urges the plate 148 toward the leg 150 of the upper plate 146. The lower plate 148 is provided with a depending stop leg 156 which is disposed to engage in a notch 158, FIGURE 10, formed in the tone control plate 38.

Referring to FIGURES 8, 15 and 21, a trip arm 160 for actuating the record raising trip mechanism is pivotally mounted on a pivot pin 162 on top of the base 10. One end 164 of the trip arm extends under the mutilated gear 104 and the other end 166 has an L-shaped leg 167 projecting upwardly therefrom. Referring to FIGURE 8, the mutilated gear 104 is provided with a leaf member 168 pivotally mounted on top thereof by a pin 170. The leaf member 168 has a pin 172 depending therefrom and extending through a slot 174 formed in the mutilated gear, to limit its travel. The pin 172 is disposed to be engaged by the slating end 164 of the lever 160. The leaf member 168 also has an upwardly projecting lug 175 disposed to engage the lug 86 when the leaf member pivots about pin 170. The tone arm 28 is provided with a downwardly extending arm 176, FIGURES 2 and 3, disposed to engage the L-shaped leg 167 when the pickup of the tone arm is lowered below the top edge of the turntable. A pin 180 on the trip arm 160 extends through a slot in the base 10, and a spring 178 connected between the pin and bore, biases the pivot arm 160 in a clockwise direction, as viewed in FIGURE 8.

Briefly, the mechanism just described perform the following functions: the tone arm at the completion of playing of a record will actuate the mechanism for the record changing cycle wherein the tone arm will be initially lifted from the record, moved to an outward position, the next record dropped from the spindle, and the tone arm moved back and lowered into the playing position. When the final record has been played, the record changing cycle will be initiated and when the tone arm has been raised and moved outward, the record changing cycle will be interrupted, and, a record raising cycle will be initiated, with the tone arm maintained in the outward position. The resords are raised from the turntable, replaced on the spindle and then the record changing cycle which had been interrupted, to maintain the tone arm in the outward position, will be picked up and part way through the record raising cycle a record will be released and the tone arm moved and lowered into playing position.

Figure 2:
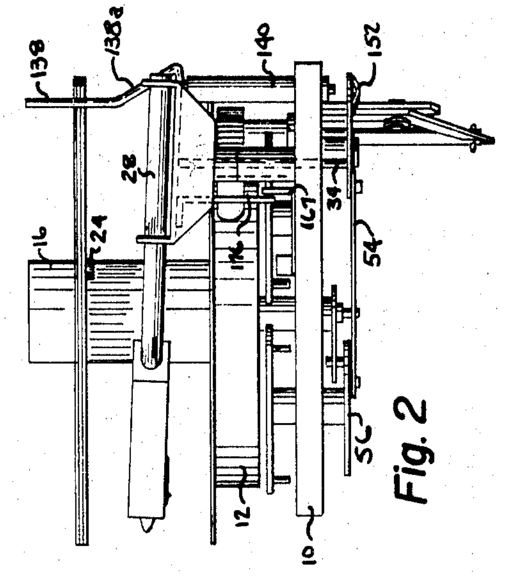
FIGURE 2 is a side elevational view of the phonograph in a record changing position.
Figure 3:
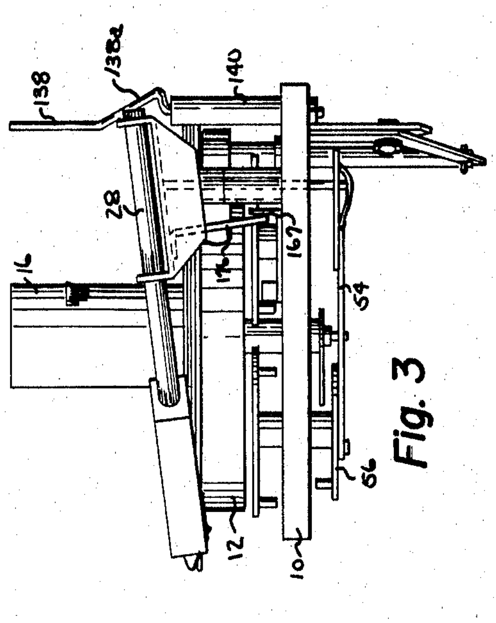
FIGURE 3 is a side elevational view of the phonograph at the start of a record replaying position.
Figures 18, 19, 20:
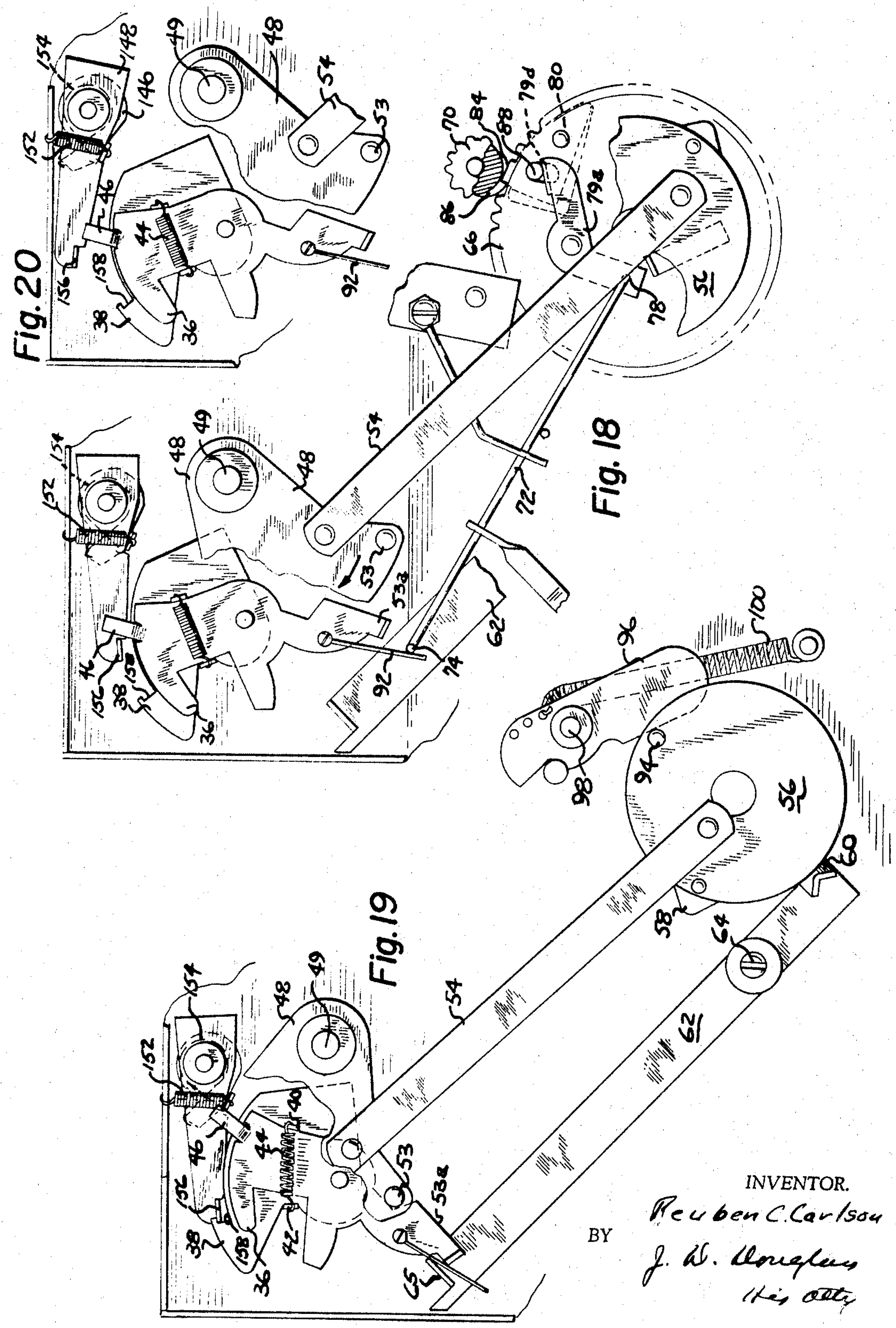
FIGURE 18 is a bottom plan view of parts of the phonograph, with the record changing cycle being initiated.
FIGURE 19 is a bottom plan view of parts of the phonograph part way through the record changing cycle wherein the arm has been raised and retracted and wherein the bottom record of the stack is being released.
FIGURE 20 is a bottom plan view of parts of the phonograph during the playing of the last record of the stack.

Referring now specifically to the action of these mechanisms, FIGURES 1, 7, 9 and 12 depict the phonograph in a playing position with the tone arm engaging a record on the turntable and with several records to be played supported above the turntable on the spindle. The spring 152, FIGURE 7, which is connected between the frame and plate 146 urges the plate 146 to rotate the sensing rod 138, to which it is attached, into contact with the edge of the records being supported, FIGURES 1 and 5. The spring 154, FIGURE 7, urges the plate 148 toward the ear 150 of the plate 146, and hence, urges the stop leg 154 depending from the plate 148 into a position in alignment with the notch 158 on the tone arm control 38. As the record continues to play, the tone arm will move in on the record which in turn will cause the tone arm swing plate 36, to which it is connected, to rotate it in the direction of the arrow in FIGURE 7, toward the position shown in FIGURE 18. The swing plate 36 abuts against the ear 42 on the control plate 38 and so moves plate 38 along with it from the position shown in FIGURE 7 to the position shown in FIGURE 18. As the plate 36 moves, the trip wire 92 which is attached to it, engages with the leg 74 of the trip rod 72; at the completion of the playing of a record the record changing cycle will be initiated by the run out groove of the record. The pressure on the rod 72 from the wire 92 will have caused it to slide sufficiently that the end 78 of the rod will have pivoted lever **79*a* to cause arm 79*d* to strike the downwardly depending pin 88 of the leaf member 80 and pivot the leaf member to a position wherein lug 84 thereof will be engaged by the lug 86 on the rotating gear 70. This position is shown in FIGURES 5 and 18. When the lug 86 strikes the lug 84 it will move the mutilated gear 66 slightly in a clockwise direction (as viewed in FIG. 18.) which will cause the teeth of the rotating gear 70 to engage the teeth of the mutilated gear 66, which will then cause rotation in a clockwise direction of the mutilated gear 66, thus starting the record changing. Rotation of the gear 66 will cause rotation of the disc 56, which will move the link 54 and cause the cam plate 48 to start moving in an arcuate path as shown by the arrow in FIGURE 18, toward the position shown in FIGURE 16. The tone arm raising pin 34, which in the record playing position has resided on the depressed cam surface 52, will ride up the cam surface 52 until it rests on the flat surface 50, causing the pin 34 to rise. The pin will contact the bottom of the tone arm pivoting it to raise the pickup, which position is shown in FIGURES 16 and 17. Coninued rotation of the disc 54 will continue the motion of the cam 48 toward the position shown in FIGURES 19 and 2. As the motion continues, the pin 53 on the cam plate 48 will strike the edge 53*a* of the swing plate 36 causing it to rotate toward the position shown in FIGURE 19, and swing the tone arm 28 to its outward position beyond the edge of the record on the turntable, FIGURE 2. The swing plate 36 which is held against the control plate 38 by the spring 44 will cause the plates 36 and 38 to rotate together. Rotation of the plates 36 and 38 together will continue until the bottom of the notch 158 on the plate 38 comes in contact with the stop leg 156. When the cam 48 continues its movement past this point, the plate 38 will be prevented from rotating with plate 36 by the action of the stop leg 156, but the plate 36 will continue to move under the urging of the pin 53, the spring 44 being stretched and placed under tension. Also, during this period of motion by the disc 56 to swing out the tone arm, the pin 94, on the disc, will contact the record releasing lever arm 96 and start rotating it against the bias of the spring 100 and when the tone arm has been swung outward beyond the edge of the records the arm 96 will actuate the mechanism in the spindle to drop the bottom record of the stack. The tone arm in the outward position and the record being dropped is shown in FIGURES 2 and 19. It should be also noted that the rotation of the disc 56 causes the projection 58 to strike the lug 60 of the lever 62 and rotate the lever about the pin 64 so that the end of the lever strikes the plate 36. Although the lever 62** does move during this record changing cycle, it does not perform any function as long as there are remaining records on the stack to be played. The arm, however, does serve a purpose when they are no records on the stack, as will be described presently.

From the position shown in FIGURES 2 and 19, continued rotation of the disc 56 will cause the cam plate 48 to start moving back again toward the playing position shown in FIGURES 1, 7 and 8. During the initial part of the return movement of the cam plate 48, the bias of the spring 44 will cause the swing plate 36 and hence the tone arm 28 to start rotating back toward the playing position. This movement under the urging of the bias of the spring 44 will continue until the edge of the swing plate 36 strikes the ear 42 on the control plate 48, at which point no further movement of swing plate relative to the control plate will occur, this being the proper "set down" point for the tone arm. The bottom of the notch 158 and stop leg 156 are so positioned that at the point where the swing plate 36 strikes the ear 42 the tone arm is directly above the record in the start of play position. During this portion of the cycle of the movement the pin 34 has remained on the flat part 50 of the cam surface of cam plate 48. Continued motion of the cam 48 forward, however, without corresponding movement of the plate 36 will cause the pin 34 to ride down into the depressed portion 52 of the cam surface on the cam 48 to cause the tone arm to be lowered until the needle engages in the starting groove of the record, at which time playing of the record will commence; this position is the one shown in FIGURES 1, 7, 8, 9 and 12. The mutilated gear will continue through its revolution until the space 68 without teeth is opposite the rotating gear 70, at which time rotation of the gear 66 stops and a record changing cycle has been completed.

Figure 4:
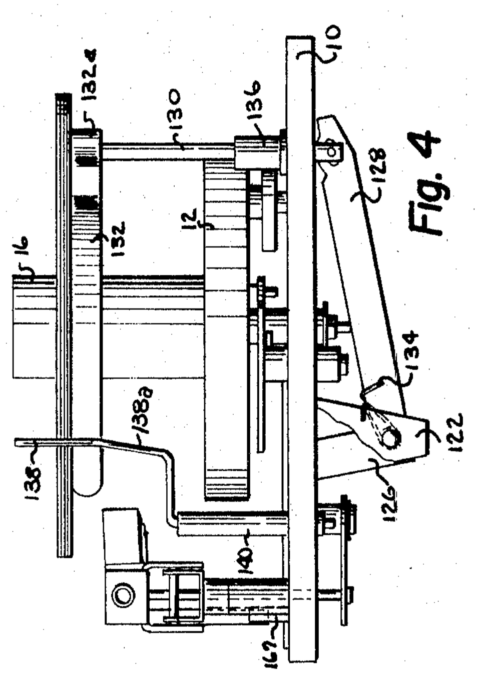
FIGURE 4 is a side elevational view of the phonograph in the record stack raising position.

At the point in the record changing cycle when the last record has dropped from the spindle for playing, the bias of spring 152 will cause the plate 148 to move the rod 138 toward the spindle 16, past where it would normally encounter the outer edge of the record, FIGURE 6. The spring 152 will, therefore, bias the plate 146 toward the outer edge of the support base 10 and the leg 150 of the plate 146 acting against the edge of plate 148 will cause the plate 148 to rotate to move the stop leg 156 out of the path of travel of the control plate 38. When the playing of this last record of the stack has been completed the record changing cycle is initiated as previously described and it commences with the mutilated gear 66 being nudged into engagement with the rotating gear 70. This cycle will then cause the tone arm to be raised by the pin 34 riding on the cam surface 52 as previously described. The swinging of the tone arm 28 outward is started under the urging of pin 53 on surface **53*a* of plate 46, just as previously described. However, as the swing plate 36 rotates moving the control plate 38 with it, the bottom of the notch 158 will not encounter the stop leg 156 of the plate 148 part way through the motion as it did when there were additional records on the spindle, since the leg 148 has been moved out of the path of the control plate 38. Hence, movement of the two plates 36 and 38 continues together to the fully extended position shown in FIGURE 14. When the link 54 starts to draw the cam 48 back from this position there is no force exerted on the swing plate 36 for corresponding movement and hence the tone arm will stay in the outward position, it being remembered that the force supplied to the plate 36 to move it forward with the cam 48 was supplied by the spring 44 being under tension due to the stop leg 156 engaging the notch 158. However, since this engagement does not take place when there is no longer a record on the stack, there is no corresponding force to actuate the plate 36 to move with the cam 48. As the cam 48 is on its return movement, the pin 34 will ride down from the flat cam surface 50 to the depressed surface 52, allowing the tone arm 28 to drop down. Since the tone arm is in the outward position and clear of the outer edge of the records on the turntable, it drops down and the arm 176 thereon engages the leg 167 of the lever 160 causing it to pivot counter clockwise as viewed in FIGURE 8 and clockwise as viewed in FIGURE 21, which causes the end 164 of the lever to strike the pin 172 on leaf member 168 causing the leaf member 168 to rotate about pin 170 and the lug 175 to be positioned in the path of lug 86. When the lug 86 strikes the lug 175 it will nudge the multilated gear 104 causing its teeth to come into meshing engagement with the rotating gear 70, see FIGURES 21 and 22. As the multilated gear 104 starts to rotate, it will rotate the cam 110, and the cam surface 112 thereof will bear against the roller 117 causing the lever 114 to pivot about the pin 116. This pivoting movement of the lever 114 causes the roller 118 to bear against arm 126 of the bell crank member 124 which will cause the bell crank 124 to rotate about pivot pin 125. This pivoting movement of bell crank 124 will cause rod 130 to rise. This will raise the record lifting member 132 and in turn will lift the records from the turntable upward past the record support members 24 to the position shown in FIGURE 4. It will be noted that the feeler rod 138 is provided with a slanted portion 138*a* which is engaged by the records on their upward passage to swing the feeler member about its axis. When the cam 110 has reached its high point, continued rotation will allow the bell crank 124 to pivot back to its original position under the urging of the spring 134 with the stack of records being supported on the support members 24**.

Figures 9, 10:
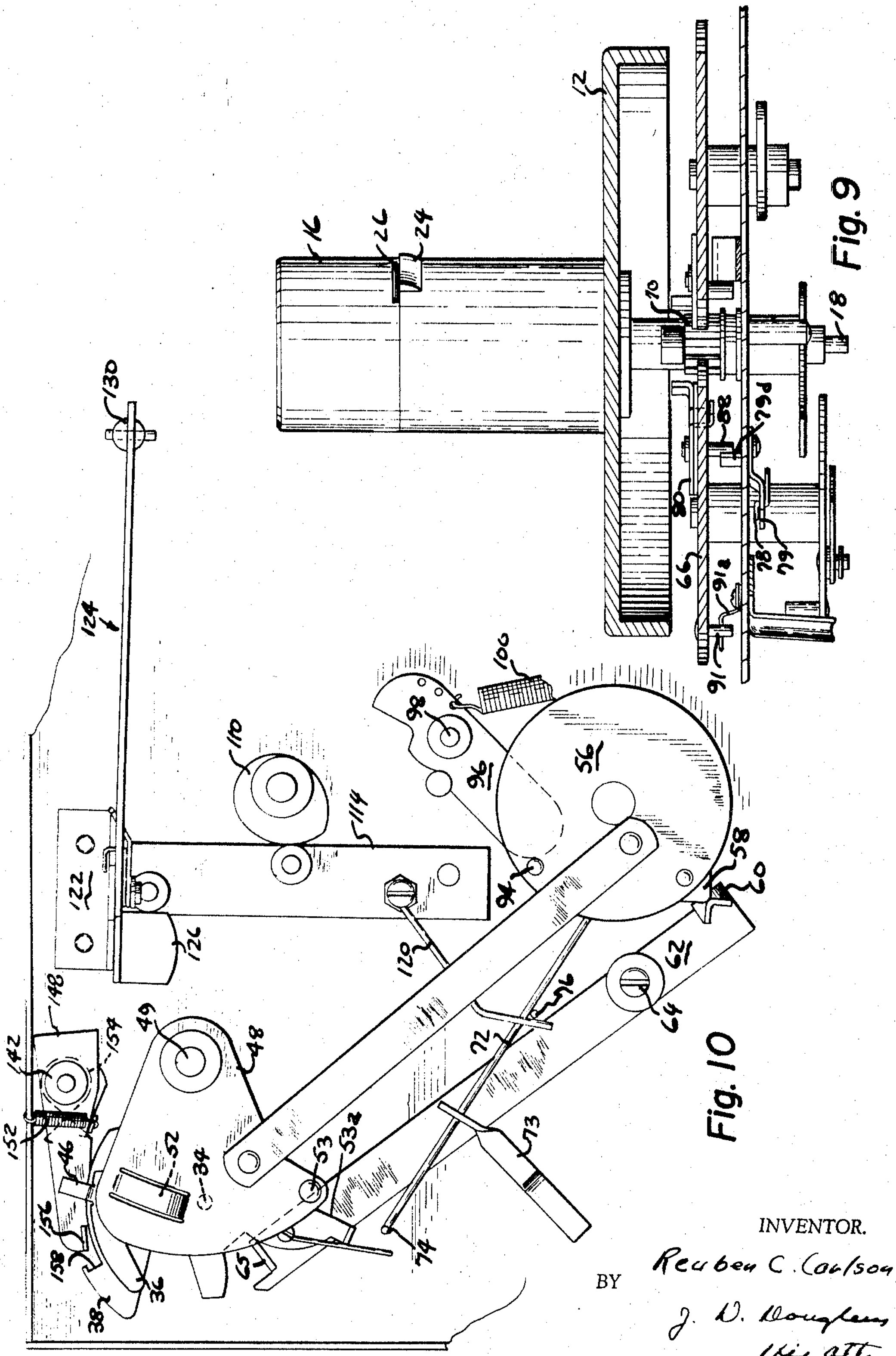
FIGURE 9 is a sectional view taken substantially along the plane designated by the line 9—9 of FIGURE 8.
FIGURE 10 is a fragmentary bottom plan view of parts of the phonograph during a later portion of the cycle for raising the records from the turntable.

The pivoting of the arm 114 will cause the wire 120 to strike the central leg 76 of the trip rod 72 and cause the rod to slide in the bracket 73 and initiate a record changing cycle, which occurs at the time when the record lifting member 132 is being lowered. It will be remembered that the tone arm is still swung outward and in its lowered position at this time. Initially, during this record changing cycle the tone arm will be raised by the action of the pin 34 sliding up from cam surface 52 to cam surface 50. At the time when the tone arm has been raised the lug 58 on the disc 56 strikes the lug 60 of rod 62. This causes the rod 62 to pivot about screw 64 and the end surface 65 will strike the edge of swing plate 36 causing the plate 36 to rotate moving the tone arm toward the spindle. The plate 36 bearing against the ear 42 on control plate 38 will cause the plate 38 to rotate with it until the notch 158 passes the stop leg 156. This position is shown in FIGURES 10 and 11. It will be noted at this point that the records have been replaced on the spindle and, hence, the rod 138 has been rotated to cause the leg 150 of the plate 148 to move away from the edge of the plate 148, placing spring 154 under tension. Hence, when the notch 158 passes the stop leg 156 the action of the spring 154 will cause the plate 148 to rotate, moving the stop leg 156 in position to engage the bottom of the notch 158. The record changing cycle then progresses with the pin 53 striking the edge **53*a* of the plate 36, causing the plate 36 to start to rotate to move the one arm away from the spindle back toward its inward position, shown in FIGURES 2 and 19. The stop leg 156 is now engaging the notch 158 which prevents the plate 38 from rotating with plate 36. From this point on the record changing cycle progresses just as previously described with the lower record being dropped onto the turntable in position for playing. The record raising cycle will have completed itself when the section 106 on the mutilated gear 104 has come into line with the gear 70, and the record changing cycle will complete itself when the space 68 on the mutilated gear 66 comes into line with the gear 70** and the bottom record of the stack will have been dropped and playing thereof commenced. Playing of this record will continue and when completed the record changing cycle will be initiated and the records on the stack on the spindle will be played successively until the last one has been played, at which time the cycle to raise the records will be initiated and the record stack will again play.

As can be seen with the phonograph of this invention, once the record player has been started and the playing of the first record commenced, the record player will continue to play as long as power is supplied thereto, the records on the stack being played over and over again.

Having thus described my invention, I am aware that numerous and extensive departures may be made therefrom without departing from the spirit or scope of the invention as defined by the appended claims.

I claim:

1. In a phonograph having a turntable, means including a tone arm to play records on the turntable, stationary spindle means, support means to support a stack of records on the spindle above the turntable, means to raise and retract the tone arm after completion of playing each record, means to release the bottom record from the stack when the tone arm is retracted, means to return the tone to a record playing position after a record is released from the stack, and means to initiate a record changing cycle after the conclusion of playing a record, the improvement which comprises sensing means disposed to sense the release of the last record from the stack supported on the spindle, and means responsive to the sensing means to raise the records from the turntable and return them to their position supported by said support means for replaying of the stack after the conclusion of playing the last record, means responsive to said sensing means to prevent the return of the tone arm to the record playing position from the retracted position and interrupt the record changing cycle while the stack is being raised, and means to initiate a record changing cycle after the stack has been raised, said means to return the tone arm to said record playing position including first spring biasing means and stop means having a first position disposed to operate against said spring biasing means when the tone arm is in the retracted position, and wherein said means to prevent movement of said tone arm includes means operative by said sensing means to move said stop means to a second position out of engagement with said spring means when the last record has been released.

2. The combination of claim 1, wherein said means to return the tone arm to said record playing position includes first plate means carried by said tone arm and movable therewith, second plate means slidably engaging said first plate means, said spring means being interconnected between said plate means, and said second plate means having a stop surface disposed to engage said stop means in said first position and positioned to be out of engagement when said stop means is in said second position.

3. The combination of claim 2, wherein said stop means has a second biasing spring normally urging it to said second position.

4. The combination of claim 3, further characterized by said sensing means including feeler means normally biased by said second biasing spring into contact with the outer edge of the records on said stack supported by said support means.

5. In a phonograph having a turntable, means including a tone arm to play records on the turntable, stationary spindle means, support means to support a stack of records on the spindle above the turntable, means to raise and retract the tone arm after completion of playing each record, means to release the bottom record from the stack when the tone arm is retracted, means to return the tone arm to a record playing position after a record is released from the stack, and means to initiate a record changing cycle after the conclusion of playing a record, the improvement which comprises sensing means disposed to sense the release of the last record from the stack supported on the spindle, and means responsive to the sensing means to raise the records from the turntable and return them to their position supported by said support means for replaying of the stack after the conclusion of playing the last record, means responsive to said sensing means to prevent the return of the tone arm to the record playing position from the retracted position and interrupt the record changing cycle while the stack is being raised, and means to initiate a record changing cycle after the stack has been raised, actuating means to actuate the record raising cycle operable by said tone arm when it is in the retracted position after the conclusion of playing the last record including gear means rotatable responsive to actuation by said tone arm, said gear means includes a mutilated gear, a rotatable gear normally out of mesh with said mutilated gear, and means to urge said mutilated gear into meshing engagement with said rotating gear responsive to movement of said tone arm.

6. The combination of claim 5 wherein said tone arm has an arm depending therefrom, means to move said tone arm vertically in the retracted position when the last record has been played and the tone arm retracted, and said actuating means includes second lever means operable by said arm responsive to vertical movement of said tone arm in the retracted position, whereby when said stop means is in said first position said tone arm will be moved to the playing position and moved vertically down and when said stop means is in said second position said tone arm will be moved vertically downward in said retracted position to actuate the means to raise the records from the turntable.

7. The combination of claim 6, wherein said means to urge said mutilated gear into meshing engagement with said rotating gear includes a leaf member pivotally mounted on said mutilated gear and an actauting lug rotatable with said rotating gear, said leaf member being movable into engagement with said lug responsive to movement of said second lever arm.

8. The combination of claim 7, wherein said means to raise the records from the turntable includes arcuate arms carried by said first lever arm and spaced peripherally from the edge of the turntable.

9. In a phonograph having a turntable, means including a tone arm to play records on the turntable, a stationary spindle means, support means to support a stack of records on the spindle above the turntable, means to raise and retract the tone arm after completion of playing each record, means to release the bottom record from the stack when the tone arm is retracted, means to return the tone arm to a record playing position after a record is released from the stack, and means to initiate a record changing cycle after the conclusion of playing a record, the improvement which comprises sensing means disposed to sense the release of the last record from the stack supported on the spindle, and means responsive to the sensing means to raise the records from the turntable and return them to their position supported by said support means for replaying of the stack after the conclusion of playing the last record, means responsive to said sensing means to prevent the return of the tone arm to the record playing position from the retracted position and interrupt the record changing cycle while the stack is being raised, and means to initiate a record changing cycle after the stack has been raised, means to initiate a record changing cycle including a rotary gear and a mutilated gear normally out of engagement with said rotating gear and means operable by said tone arm to engage said mutilated gear with said rotating gear when the tone arm completes playing a record, said means to raise and retract the tone arm includes a link operable by said mutilated gear, and cam means operable by said link.

References Cited

UNITED STATES PATENTS

| | | | |
|---|---|---|---|
| 2,685,447 | 8/1954 | Ristau et al. | 274—10 |
| 2,976,047 | 3/1961 | Edwards | 274—10 |
| 2,978,249 | 4/1961 | Bailey et al. | 274—10 |

HARRY N. HAROIAN, *Primary Examiner.*